(12) United States Patent
Kumar et al.

(10) Patent No.: US 11,436,097 B1
(45) Date of Patent: Sep. 6, 2022

(54) TECHNIQUE FOR EFFICIENT DATA FAILOVER IN A MULTI-SITE DATA REPLICATION ENVIRONMENT

(71) Applicant: Nutanix, Inc., San Jose, CA (US)

(72) Inventors: Ashish Kumar, Karnataka (IN); Freddy James, Maharastra (IN); Kai Tan, Cary, NC (US); Pranab Patnaik, Cary, NC (US)

(73) Assignee: Nutanix, Inc., San Jose, CA (US)

( * ) Notice: Subject to any disclaimer, the term of this patent is extended or adjusted under 35 U.S.C. 154(b) by 0 days.

(21) Appl. No.: 17/322,427

(22) Filed: May 17, 2021

(30) Foreign Application Priority Data

Mar. 31, 2021 (IN) .............................. 202141014977

(51) Int. Cl.
```
G06F 11/00     (2006.01)
G06F 11/14     (2006.01)
G06F 11/20     (2006.01)
G06F 3/06      (2006.01)
G06F 16/182    (2019.01)
```
(52) U.S. Cl.
CPC ........ *G06F 11/1464* (2013.01); *G06F 3/0668* (2013.01); *G06F 11/008* (2013.01); *G06F 11/1469* (2013.01); *G06F 11/2023* (2013.01); *G06F 16/1824* (2019.01); *G06F 2201/84* (2013.01)

(58) Field of Classification Search
CPC ............. G06F 11/1464; G06F 11/1469; G06F 11/2023; G06F 2201/84; G06F 16/1824; G06F 3/0668
See application file for complete search history.

(56) References Cited

U.S. PATENT DOCUMENTS

| | | |
|---|---|---|
| 8,285,681 B2 | 10/2012 | Prahlad et al. |
| 8,332,354 B1 | 12/2012 | Chatterjee et al. |
| 8,549,518 B1 | 10/2013 | Aron et al. |

(Continued)

OTHER PUBLICATIONS

F5 Glossary "Recovery Point Objective", F5, Inc. 2020 (Year: 2020).*

(Continued)

*Primary Examiner* — Michael Maskulinski
(74) *Attorney, Agent, or Firm* — Cesari and McKenna, LLP (57) ABSTRACT

A technique provides efficient data failover by creation and deployment of a protection policy that ensures maintenance of frequent common snapshots between sites of a multi-site data replication environment. A global constraint optimizer executes on a node of a cluster to create the protection policy for deployment among other nodes of clusters at the sites. Constraints such as protection rules (PRs) specifying, e.g., an amount of tolerable data loss are applied to a category of data designated for failover from a primary site over a network to a plurality of (secondary and tertiary) sites typically located at geographically separated distances. The optimizer processes the PRs to compute parameters such as frequency of snapshot generation and replication among the sites, as well as retention of the latest common snapshot maintained at each site to create a recovery point and configuration of the protection policy that reduces network traffic for efficient use of the network among the sites.

20 Claims, 5 Drawing Sheets

(56) References Cited

U.S. PATENT DOCUMENTS

| | | |
|---|---|---|
| 8,601,473 B1 | 12/2013 | Aron et al. |
| 8,850,130 B1 | 9/2014 | Aron et al. |
| 8,863,124 B1 | 10/2014 | Aron et al. |
| 9,009,106 B1 | 4/2015 | Aron et al. |
| 9,069,708 B2 | 6/2015 | Gill et al. |
| 9,201,736 B1 | 12/2015 | Moore et al. |
| 9,336,132 B1 | 5/2016 | Aron et al. |
| 9,430,337 B1* | 8/2016 | Gupta ................. G06F 11/1464 |
| 9,632,874 B2 | 4/2017 | Pawar et al. |
| 9,652,265 B1 | 5/2017 | Narayanasamy et al. |
| 9,747,287 B1 | 8/2017 | Bhardwaj et al. |
| 9,772,866 B1 | 9/2017 | Aron et al. |
| 9,785,523 B2 | 10/2017 | Chiruvolu et al. |
| 10,223,365 B2 | 3/2019 | Kottomtharayil et al. |
| 2015/0074458 A1 | 3/2015 | Atluri et al. |
| 2015/0212897 A1* | 7/2015 | Kottomtharayil ... G06F 11/1458 714/20 |
| 2016/0357642 A1 | 12/2016 | Burshan et al. |
| 2018/0157561 A1* | 6/2018 | Venkatesh ............. G06F 3/0619 |
| 2019/0171374 A1 | 6/2019 | Jain et al. |
| 2020/0348842 A1 | 11/2020 | Meadowcroft et al. |
| 2021/0120039 A1* | 4/2021 | Bett ................... G06F 11/1451 |

OTHER PUBLICATIONS

Dell EMC Integrated Data Protection Product Guide, Dell EMC, Dec. 7, 2021 (Year: 2021).*

Sengupta et al., "Multi-site data distribution for disaster recovery—A planning framework", Aug. 8, 2014, Future Generation Computer Systems 41 2014) pp. 53-64. (Year: 2014).*

Cano, Ignacio, "Curator: Self-Managing Storage for Enterprise Clusters" University of Washington; published Mar. 2017; pp. all.

Poitras, Steven "The Nutanix Bible" from http://stevenpoitras.com/the-nutanix-bible/ Oct. 15, 2013 (Publication date based on indicated capture date by Archive.org first publication date unknown) pp. all.

Poitras, Steven "The Nutanix Bible" from https://nutanixbible.com/ Sep. 17, 2019 pp. all.

* cited by examiner

TECHNIQUE FOR EFFICIENT DATA FAILOVER IN A MULTI-SITE DATA REPLICATION ENVIRONMENT

CROSS-REFERENCE TO RELATED APPLICATIONS

The present application claims the benefit of India Provisional Patent Application Serial No. 202141014977, which was filed on Mar. 31, 2021, by Ashish Kumar, et al. for TECHNIQUE FOR EFFICIENT DATA FAILOVER IN A MULTI-SITE DATA REPLICATION ENVIRONMENT, which is hereby incorporated by reference.

BACKGROUND

Technical Field

The present disclosure relates to data failover and, more specifically, to data failover using snapshots in a multi-site data replication environment.

Background Information

Data failover generally involves copying or replicating data among multiple datacenters to enable continued operation of data processing operations in a multi-site data replication environment, such as backup, content distribution and disaster recovery. As used herein, the multi-site data replication environment includes more than two datacenters, i.e., sites, which are often geographically separated by relatively large distances and connected over a communication network, e.g., a wide area network. For example, data at a local datacenter (primary site) may be replicated over the network to a plurality of remote datacenters located at geographically separated distances to ensure continued data processing operations in the event of a failure of the primary site.

Data may be replicated between the sites such that each update to the data at the primary site is copied to the remote sites. However, copying of each data update typically results in constant transfer of data over networks spanning geographical areas in the multi-site data replication environment, which may be costly and expensive, as the network is often poorly utilized leading to needless replication with commensurate bandwidth reduction and often a failure to meet (satisfy) recovery point objective thresholds.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

Overview

The embodiments described herein are directed to a technique configured to provide network efficient data failover by creation and deployment of a protection policy that ensures network efficient distribution and maintenance (update) of frequent common snapshots between sites of a multi-site data replication environment so as to satisfy recovery point objectives (RPO) for data across the sites. The common snapshots ensure that, in the event of failure to a site, data designated for failover may be quickly protected by replicating only small incremental changes to the latest common snapshot so as to maintain recovery point requirements across the sites. A global constraint optimizer executes on a node of a cluster to create the protection policy for deployment among other nodes of clusters at the sites. Constraints such as protection rules (PRs) specifying, e.g., an amount of tolerable data loss, may be applied to a category of data designated for failover from a local datacenter (primary site) over a network to a plurality of remote datacenters (secondary and tertiary sites) typically located at geographically separated distances. The optimizer processes the PRs to determine (compute) parameters such as frequency of snapshot generation and replication among the sites, e.g., from the primary site to the secondary and tertiary sites, as well as retention of a latest common snapshot maintained at each site as a recovery point to configure the protection policy that reduces network traffic for efficient use of the network among the sites (i.e., reduce unnecessary data replication among the sites).

In an embodiment, an administrator interacts with the global constraint optimizer to create the protection policy by defining the category of data (e.g., virtual machines) designated for failover protection. In addition, the administrator defines the PRs, such as the recovery point objective (RPO) that specifies an amount of data loss (e.g., expressed in units of time) that is tolerable in the event of primary site failure. Depending on the specified value of the RPO, a type of data replication is determined. For example, if an administrator defines a recovery point objective with no tolerable data loss (e.g., RPO=0), then synchronous replication may be selected for copying (replicating) the data among the sites. However, if a specified amount of data loss is tolerable (i.e., RPO>0), then asynchronous (incremental) replication may be selected between the sites. Regardless of the type of replication, the optimizer computes a schedule that defines the frequency at which snapshots are periodically generated and replicated as (i) mirroring references for synchronous replication or (ii) incremental changes/identifiers for asynchronous replication. Additionally, the computed schedule defines the number of snapshots needed to be retained to ensure availability of the latest common snapshot used as the recovery point at each site to satisfy RPO requirements.

Description

Figure 1:
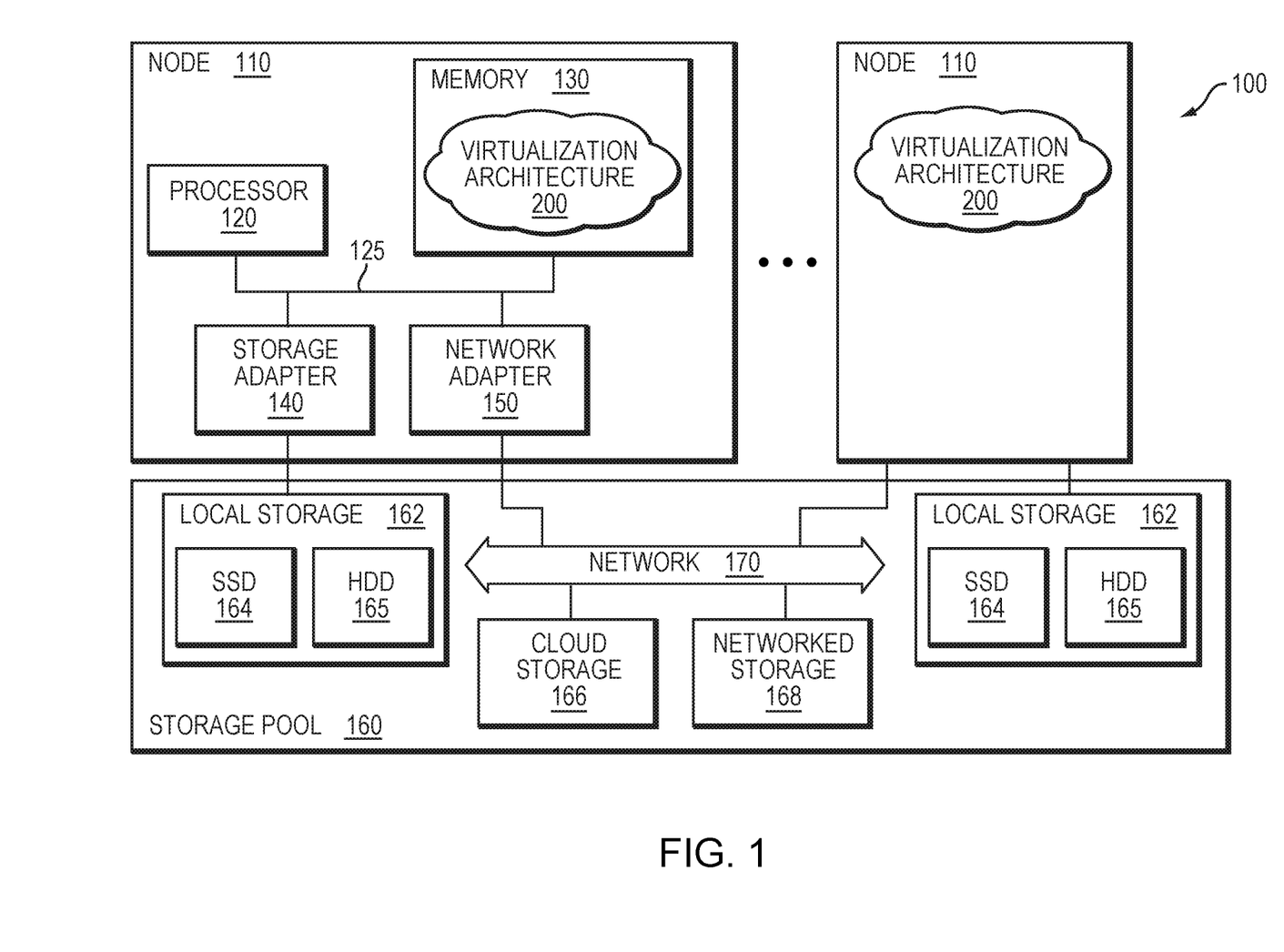
FIG. 1 is a block diagram of a plurality of nodes interconnected as a cluster in a virtualized environment.

FIG. 1 is a block diagram of a plurality of nodes 110 interconnected as a cluster 100 and configured to provide compute and storage services for information, i.e., data and metadata, stored on storage devices of a virtualization environment. Each node 110 is illustratively embodied as a physical computer having hardware resources, such as one or more processors 120, main memory 130, one or more storage adapters 140, and one or more network adapters 150 coupled by an interconnect, such as a system bus 125. The storage adapter 140 may be configured to access information stored on storage devices, such as solid state drives (SSDs) 164 and magnetic hard disk drives (HDDs) 165, which are organized as local storage 162 and virtualized within multiple tiers of storage as a unified storage pool 160, referred to as scale-out converged storage (SOCS) accessible cluster-wide. To that end, the storage adapter 140 may include input/output (I/O) interface circuitry that couples to the storage devices over an I/O interconnect arrangement, such as a conventional peripheral component interconnect (PCI) or serial ATA (SATA) topology.

The network adapter 150 connects the node 110 to other nodes 110 of the cluster 100 over a network, which is illustratively an Ethernet local area network (LAN) 170. The network adapter 150 may thus be embodied as a network interface card having the mechanical, electrical and signaling circuitry needed to connect the node 110 to the LAN. In an embodiment, one or more intermediate stations (e.g., a network switch, router, or virtual private network gateway) may interconnect the LAN with network segments organized as a wide area network (WAN) to enable communication between the nodes of cluster 100 and remote nodes of a remote cluster over the LAN and WAN (hereinafter "network") as described further herein. The multiple tiers of SOCS include storage that is accessible through the network, such as cloud storage 166 and/or networked storage 168, as well as the local storage 162 within or directly attached to the node 110 and managed as part of the storage pool 160 of storage objects, such as files and/or logical units (LUNs). The cloud and/or networked storage may be embodied as network attached storage (NAS) or storage area network (SAN) and include combinations of storage devices (e.g., SSDs and/or HDDs) from the storage pool 160. Communication over the network may be effected by exchanging discrete frames or packets of data according to protocols, such as the Transmission Control Protocol/Internet Protocol (TCP/IP) and User Datagram Protocol (UDP), as well as protocols for authentication, such as the OpenID Connect (OIDC) protocol, and other protocols for secure transmission, such as the HyperText Transfer Protocol Secure (HTTPS) may also be advantageously employed.

The main memory 130 includes a plurality of memory locations addressable by the processor 120 and/or adapters for storing software code (e.g., processes and/or to services) and data structures associated with the embodiments described herein. The processor and adapters may, in turn, include processing elements and/or circuitry configured to execute the software code, such as virtualization software of virtualization architecture 200, and manipulate the data structures. As described herein, the virtualization architecture 200 enables each node 110 to execute (run) one or more virtual machines that write data to the unified storage pool 160 as if they were writing to a SAN. The virtualization environment provided by the virtualization architecture 200 relocates data closer to the virtual machines consuming the data by storing the data locally on the local storage 162 of the cluster 100 (if desired), resulting in higher performance at a lower cost. The virtualization environment can horizontally scale from a few nodes 110 to a large number of nodes, enabling organizations to scale their infrastructure as their needs grow.

It will be apparent to those skilled in the art that other types of processing elements and memory, including various computer-readable media, may be used to store and execute program instructions pertaining to the embodiments described herein. Also, while the embodiments herein are described in terms of software code, processes, and computer (e.g., application) programs stored in memory, alternative embodiments also include the code, processes and programs being embodied as logic, components, and/or modules consisting of hardware, software, firmware, or combinations thereof.

Figure 2:
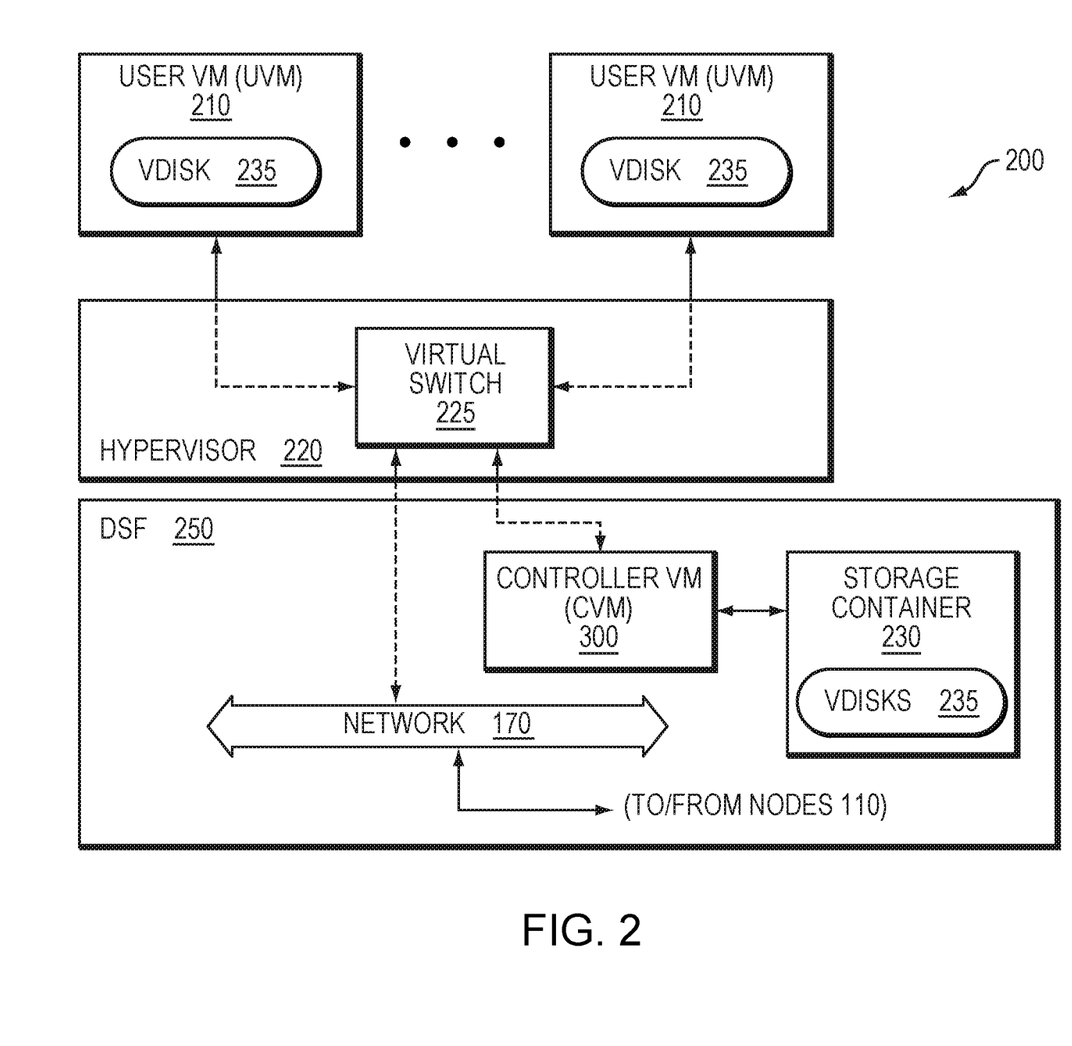
FIG. 2 is a block diagram of a virtualization architecture executing on a node to implement the virtualization environment.

FIG. 2 is a block diagram of a virtualization architecture 200 executing on a node to implement the virtualization environment. Each node 110 of the cluster 100 includes software components that interact and cooperate with the hardware resources to implement virtualization. The software components include a hypervisor 220, which is a virtualization platform configured to mask low-level hardware operations from one or more guest operating systems executing in one or more user virtual machines (UVMs) 210 that run client software. The hypervisor 220 allocates the hardware resources dynamically and transparently to manage interactions between the underlying hardware and the UVMs 210. In an embodiment, the hypervisor 220 is illustratively the Nutanix Acropolis Hypervisor (AHV), although other types of hypervisors, such as the Xen hypervisor, Microsoft's Hyper-V, RedHat's KVM, and/or VMware's ESXi, may be used in accordance with the embodiments described herein.

Another software component running on each node 110 is a special virtual machine, called a controller virtual machine (CVM) 300, which functions as a virtual controller for SOCS. The CVMs 300 on the nodes 110 of the duster 100 interact and cooperate to form a distributed system that manages all storage resources in the cluster. Illustratively, the CVMs and storage resources that they manage provide an abstraction of a distributed storage fabric (DSF) 250 that scales with the number of nodes 110 in the cluster 100 to provide cluster-wide distributed storage of data and access to the storage resources with data redundancy across the duster. That is, unlike traditional NM/SAN solutions that are limited to a small number of fixed controllers, the virtualization architecture 200 continues to scale as more nodes are added with data distributed across the storage resources of the cluster. As such, the cluster operates as a hyper-convergence architecture wherein the nodes provide both storage and computational resources available duster wide.

The client software (e.g., applications) running in the UVMs 210 may access the DSF 250 using filesystem protocols, such as the network file system (NFS) protocol, the common internet file system (CIFS) protocol and the internet small computer system interface (iSCSI) protocol. Operations on these filesystem protocols are interposed at the hypervisor 220 and redirected (via virtual switch 225) to the CV M 300, which exports one or more iSCSI, CIFS, or NFS targets organized from the storage objects in the storage pool 160 of DSF 250 to appear as disks to the UVMs 210. These targets are virtualized, e.g., by software running on the CVMs, and exported as virtual disks (vdisks) 235 to the UVMs 210. In some embodiments, the vdisk is exposed via iSCSI, CIFS or NFS and is mounted as a virtual disk on the UVM 21.0. User data (including the guest operating systems) in the UVMs 210 reside on the vdisks 235 and operations on the vdisks are mapped to physical storage devices (SSDs and/or HDDs) located in DSP 250 of the cluster 100.

In an embodiment, the virtual switch 225 may be employed to enable I/O accesses from a UVM 210 to a storage device via a CVM 300 on the same or different node 110. The UVM 210 may issue the 110 accesses as a SCSI protocol request to the storage device. Illustratively, the hypervisor 220 intercepts the SCSI request and converts it to an iSCSI, CIFS, or NFS request as part of its hardware emulation layer. As previously noted, a virtual SCSI disk attached to the UVM 210 may be embodied as either an iSCSI LUN or a file served by an NFS or CIFS server. An iSCSI initiator, SMB/CIFS or NFS client software may be employed to convert the SCSI-formatted UVM request into an appropriate iSCSI, CIFS or NFS formatted request that can be processed by the CVM 300. As used herein, the terms iSCSI, CIFS and NFS may be interchangeably used to refer to an IP-based storage protocol used to communicate between the hypervisor 220 and the CVM 300. This approach obviates the need to individually reconfigure the software executing in the UVMs to directly operate with the IP-based storage protocol as the IP-based storage is transparently provided to the UVM.

For example, the IP-based storage protocol request may designate an IP address of a CVM 300 from which the UVM 210 desires I/O services. The IP-based storage protocol request may be sent from the UVM 210 to the virtual switch 225 within the hypervisor 220 configured to forward the request to a destination for servicing the request. If the request is intended to be processed by the CVM 300 within the same node as the UVM 210, then the IP-based storage protocol request is internally forwarded within the node to the CVM. The CVM 300 is configured and structured to properly interpret and process that request. Notably the IP-based storage protocol request packets may remain in the node 110 when the communication the request and the response begins and ends within the hypervisor 220. In other embodiments, the IP-based storage protocol request may, be routed by the virtual switch 225 to a CVM 300 on another node of the same or different cluster for processing. Specifically, the IP-based storage protocol request may be forwarded by the virtual switch 225 to an intermediate station (not shown) for transmission over the network (e.g., WAN) to the other node. The virtual switch 225 within the hypervisor 220 on the other node then forwards the request to the CVM 300 on that node for further processing.

Figure 3:
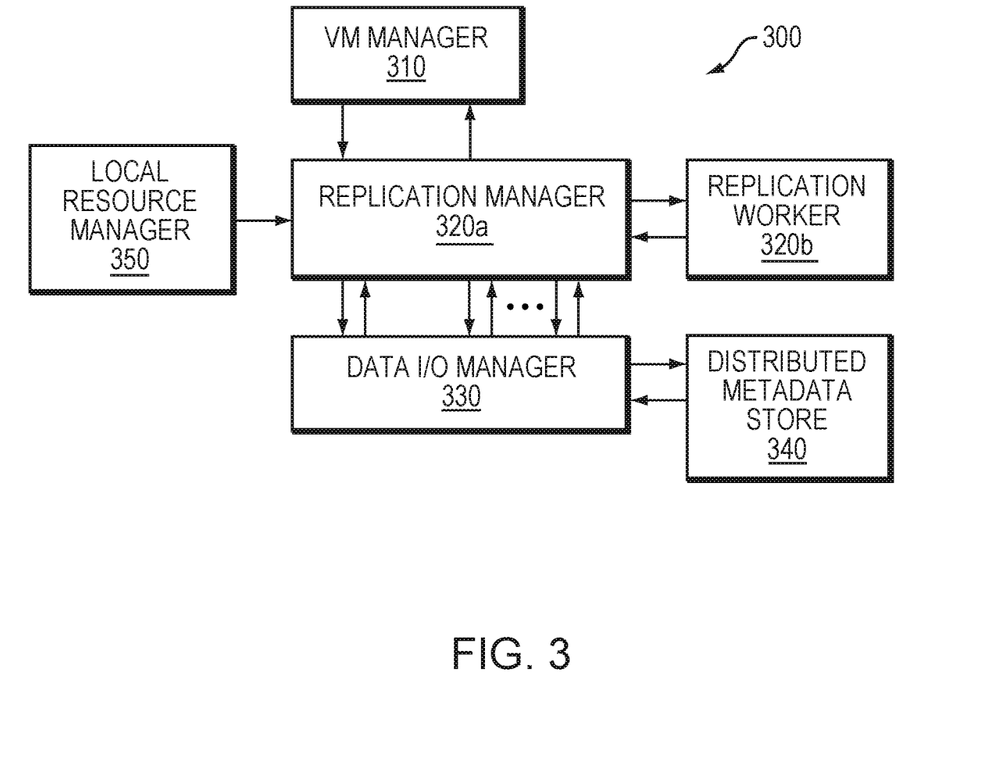
FIG. 3 is a block diagram of a controller virtual machine of the virtualization architecture.

FIG. 3 is a block diagram of the controller virtual machine (CVM) 300 of the virtualization architecture 200. In one or more embodiments, the CVM 300 runs an operating system (e.g., the Acropolis operating system) that is a variant of the Linux® operating system, although other operating systems may also be used in accordance with the embodiments described herein. The CVM 300 functions as a distributed storage controller to manage storage and 110 activities within DSF 250 of the cluster 100. Illustratively the CVM 300 runs as a virtual machine above the hypervisor 220 on each node and cooperates with other CVMs in the cluster to form the distributed system that manages the storage resources of the cluster, including the local storage 162, the networked storage 168, and the cloud storage 166. Since the CVMs run as virtual machines above the hypervisors and, thus, can be used in conjunction with any hypervisor from any virtualization vendor, the virtualization architecture 200 can be used and implemented within any virtual machine architecture, allowing the CVM to be hypervisor agnostic. The CVM 300 may therefore be used in variety of different operating environments due to the broad interoperability of the industry standard IP-based storage protocols (e.g., iSCSI, CIFS, and NFS) supported by the CVM.

Illustratively, the CVM 300 includes a plurality of processes embodied as a storage stack that may be decomposed into a plurality of threads running in a user space of the operating system of the CVM to provide storage and 110 management services within DSF 250. In an embodiment, the user mode processes include a virtual machine (VM) manager 310 configured to manage creation, deletion, addition and removal of virtual machines (such as UVMS 210) on a node 110 of the cluster 100. For example, if a UVM fails or crashes, the VIM manager 310 may spawn another UVM 210 on the node. A local resource manager 350 allows users (administrators) to monitor and manage resources of the cluster. A replication manager 320a is configured to provide replication and disaster recovery services of DSF 250 and, to that end, cooperates with the local resource manager 350 to implement the services, such as migration/failover of virtual machines and containers, as well as scheduling of snapshots. In an embodiment, the replication manager 320a may also interact with one or more replication workers 320b. A data manager 330 is responsible for all data management and I/O operations in DSF 250 and provides a main interface to/from the hypervisor 220, e.g., via the IP-based storage protocols. Illustratively, the data I/O manager 330 presents a vdisk 235 to the UVM 210 in order to service 110 access requests by the UVM to the DFS. A distributed metadata store 340 stores and manages all metadata in the node/cluster, including metadata structures that store metadata used to locate (map) the actual content of vdisks on the storage devices of the cluster.

Data failover generally involves copying or replicating data among one or more nodes 110 of clusters 100 embodied as, e.g., datacenters to enable continued operation of data processing operations in a multi-site data replication environment, such as backup, content distribution and disaster recovery. The multi-site data replication environment includes more than two datacenters, i.e., sites, which are typically geographically separated by relatively large distances and connected over a communication network, such as a WAN. For example, data at a local datacenter (primary site) may be replicated over the network to a plurality of remote datacenters (secondary and tertiary sites) located at geographically separated distances to ensure continuity of data processing operations in the event of a failure of the nodes at the primary site.

Synchronous replication may be used to replicate the data between the sites such that each update to the data at the primary site is copied to the secondary and tertiary sites. For instance, every update (e.g., write operation) issued by a UVM 210 to data designated for failover (i.e., failover data) is continuously replicated from the primary site to the secondary site before the write operation is acknowledged to the UVM. Thus, if the primary site fails, the secondary site has an exact (i.e., mirror copy) of the failover data at all times. Synchronous replication generally does not require the use of snapshots of the data; however, to establish a multi-site data replication environment or to facilitate recovery from, e.g., network outages in such an environment, a snapshot may be employed to establish a point-in-time reference from which the sites can (re)synchronize the failover data.

In the absence of continuous synchronous replication between the sites, the current state of the failover data at the secondary site always "lags behind" (is not synchronized with) that of the primary site resulting in possible data loss in the event of a failure of the primary site. If a specified amount of time lag in synchronization is tolerable (e.g., 60 mins), then asynchronous (incremental) replication may be selected between the sites, for example, a point-in-time image replication from the primary site to the secondary site is not more than 60 minutes behind. Incremental replication generally involves at least two point-in-time images or snapshots of the data to be replicated, e.g., a base snapshot that is used as a reference and a current snapshot that is used to identify incremental changes to the data since the base snapshot. To facilitate efficient incremental replication in a multi-site data protection environment, a base snapshot is required at each site. Note that the data may include an entire state of a virtual machine including associated storage objects.

Figure 4:
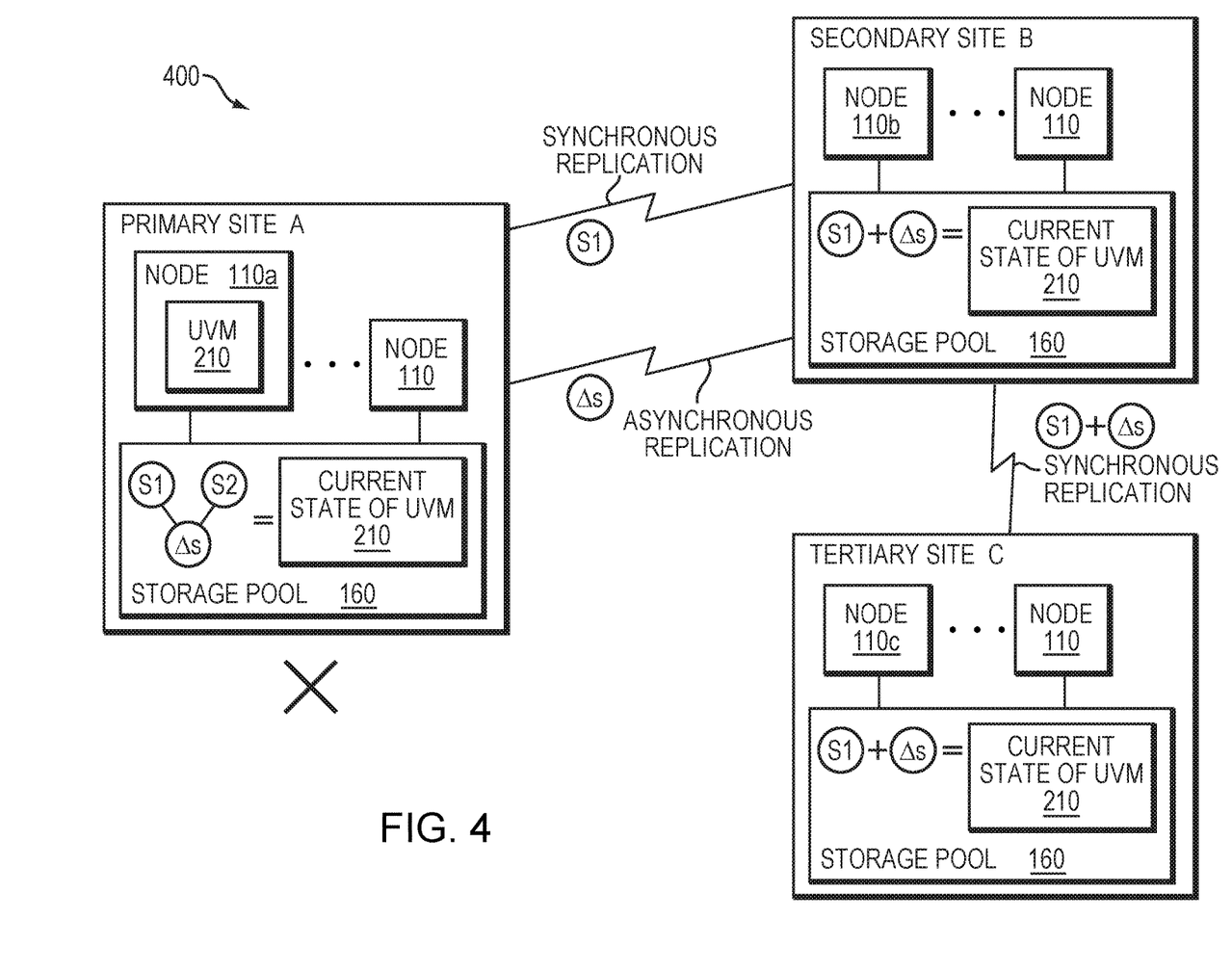
FIG. 4 is a block diagram of an exemplary multi-site data replication environment configured for use in various deployments such as for backup, content distribution, and/or disaster recovery.

FIG. 4 is a block diagram of an exemplary multi-site data replication environment configured for use in various deployments, such as for backup, content distribution (CD) and/or disaster recovery (DR). Illustratively, the multi-site environment 400 includes three sites: primary site A, secondary site B and tertiary site C, wherein each site represents a datacenter embodied as a cluster 100 having one or more nodes 110. A category of data (e.g., one or more UVMs 210) running on primary node 110a at primary site A is designated for failover to secondary site B (e.g., secondary node 110b) in the event of failure of primary site A. A first snapshot S1 of the data is generated at the primary site A and replicated (e.g., via synchronous replication) to secondary site B as a base or "common" snapshot S1. A period of time later, a second snapshot S2 may be generated at primary site A to reflect a current state of the data (e.g., UVM 210). Since the common snapshot S1 exists at sites A and B, only incremental changes (deltas Δs) to the data designated for failover need be sent (e.g., via asynchronous replication) to site B, which applies the deltas (Δs) to S1 so as to synchronize the state of the UVM 210 to the time of the snapshot S2 at the primary site. A tolerance of how long before data loss will exceed what is acceptable determines (i.e., imposes) a frequency of snapshots and replication of deltas to failover sites, e.g., a data loss tolerance of 60 mins requires snapshots with commensurate delta replication every 60 mins—deemed a Recovery Point Objective (RPO) of 60 minutes.

To support further redundancy and cascading failure, if primary site A fails (as denoted by X), a failover operation of the data is performed to secondary site B, which may now be designated as the new primary site of the failover data. Secondary site B may then replicate (e.g., via synchronous replication) the common snapshot S1 and any applied deltas (Δs) to tertiary site C to reflect the current state (i.e., state at time of snapshot S2) of the UVM 210. Tertiary site C then becomes the new secondary site in the event of failure to secondary (new primary) site B. However, to avoid excessive bandwidth consumption among the sites, data replication relationships may not be established among each site of the multi-site data replication environment 400, i.e., each site may not have a copy of common snapshot S1 at the time of failure of primary site A, so that during disaster recovery, an excess amount of data may be replicated (i.e., a full replication of S1 and applied Δs) to at least one site (tertiary site C). Accordingly, an improved data replication relationship while efficiently using bandwidth among the sites is desirable to provide effective data failover.

The embodiments described herein are directed to a technique configured to provide network efficient data failover by creation and deployment of a protection policy that ensures network efficient distribution and maintenance (update) of frequent common snapshots between sites of a multi-site data replication environment so as to meet (satisfy) RPO for data across the sites. The common snapshots ensure that, in the event of failure to a site, data designated for failover may be quickly protected by replicating only small incremental changes to the latest common snapshot so as to maintain recovery point requirements across the sites. Efficient data failover may be further achieved through the use of common snapshots and incremental changes to data designated for failover protection based on the protection policy that includes a schedule (configuration) and snapshot retention rules to realize the recovery point at each site.

According to the technique, a global constraint optimizer executes on a node of a cluster to create the protection policy for deployment among other nodes of clusters at the sites. Constraints such as protection rules (PRs) specifying, e.g., an amount of tolerable data loss, may be applied to a category of data designated for failover from a local datacenter (primary site) over a network to a plurality of remote datacenters (secondary and tertiary sites) typically located at geographically separated distances. The optimizer processes the PRs to determine (compute) parameters such as frequency of snapshot generation and replication among the sites, e.g., from the primary site to the secondary and tertiary sites, as well as retention of a latest common snapshot maintained at each site as the recovery point to configure the protection policy that reduces network traffic for efficient use of the network among the sites (i.e., reduce unnecessary data replication among the sites).

Figure 5:
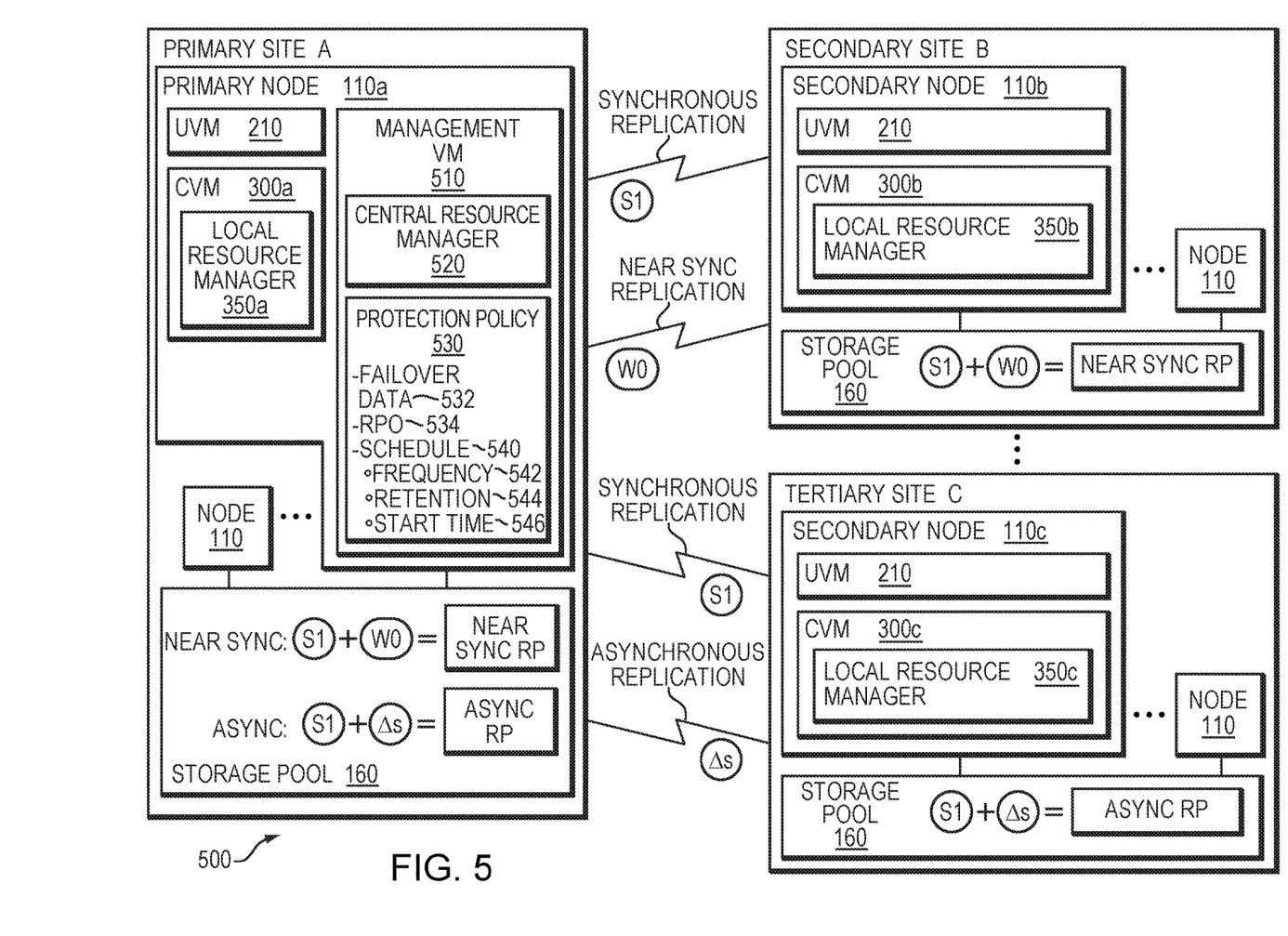
FIG. 5 is a block diagram illustrating a data failover technique that includes a global constraint optimizer configured to create a protection policy for deployment among nodes of the multi-site environment.

FIG. 5 is a block diagram illustrating a data failover technique 500 that includes the global constraint optimizer configured to create the protection policy 530 for deployment among nodes of the multi-site environment based on RPO requirements for a given dataset (e.g., data of UVM 210). Illustratively, the global constraint optimizer is embodied as a central resource manager (process) 520 cooperating with one or more local resource managers 350a-c running in management and control planes of the various datacenter sites (e.g., clusters) in the multi-site environment. To that end, the local resource manager 350a runs on a CVM 300a of primary node 110a at the primary site A, and local resource managers 350b,c run on CVMs 300b,c at secondary and tertiary nodes 110b,c of secondary and tertiary sites B-C respectively, whereas the central resource manager 520 runs on a management VM 510 of, e.g., the primary node 110a at the primary site A. Notably, the central resource manager 520 provides a user interface (UI) embodied as a website to provide a "pane of glass" for the administrator to manage and control multiple clusters via the local resource managers 350a-c. As a result, the central resource manager 520 may run on a management VM 510 of any node of a cluster at the primary, secondary or tertiary sites.

In an embodiment, an administrator interacts with the global constraint optimizer to create the protection policy 530 by defining constraints such as the category of data (e.g., vdisks, UVMs) designated for failover protection (failover data 532) in the multi-site data replication environment. Note that for each data category (e.g., UVM 210), there is only one "live" (active) version of the failover data 532 at a source site (origin), e.g., the primary site, which is an origin for replicating the snapshots to the remote sites (e.g., secondary and tertiary sites). Each live version (UVM instance) of the failover data category is considered unique and replicated (via one or more snapshots) from its source site to the remote sites of the environment based on a global configuration schedule of the protection policy. The multi-site environment may embody various network topologies, including hub and spoke, daisy chain, full/partial mesh or, as illustratively shown herein, site-to-site topologies. However, replication is implemented "pair-wise" among the sites.

In addition, the administrator defines the PRs, such as a recovery point objective (RPO 534) that specifies an amount of data loss that a user, e.g., a business, can tolerate in the event of a datacenter failure. As stated previously, the RPO 534 is typically expressed in units of time (e.g., seconds, minutes, hours, etc.) and is expressed (i.e., embodied) as a PR by the administrator through interaction with the central resource manager 520. Depending on the specified value of the RPO, a type of data replication is determined, e.g., synchronous (mirroring) or asynchronous. For example, if an administrator defines a recovery point objective with no tolerable data loss (e.g., RPO=0), then synchronous replication may be selected for copying (replicating) the data among the sites. However, if a specified amount of data loss is tolerable (e.g., RPO>0), then asynchronous (incremental) replication may be selected between the sites. Note that the specified amount of tolerable data loss depends on a periodicity of replication between the sites. For a periodicity of less than 15 minutes (e.g., RPO<15 mins), a form of replication deemed as near synchronous (near sync) replication may be employed that uses light weight snapshots (LWS) based on write operation logs prior to storing data at rest. Broadly stated, the LWS is created using a logged group of write operations (e.g., may not yet be stored at rest) that represents the current failover data of the UVM at the primary site (organized as a file) which may be replicated to the secondary site in accordance with the specified RPO periodicity. In this manner, low RPOs may be accommodated with minimal network and computational overhead.

According to the technique, the global constraint optimizer computes and configures a schedule 540 of the protection policy 530 that is directed to generation and replication of periodic common snapshots (i.e., frequency 542) at each site of the multi-site environment, as well as retention of the latest common snapshot used as the recovery point until the next latest common snapshot is generated and replicated (i.e., retention 544). Effectively, for a given data the global constraint optimizer determines sets of snapshots to retain at each site for replication in order to satisfy the RPO requirements of that data so that deltas (rather than full snapshots) may be replicated, thereby reducing total network use by avoiding needless data replication. In an embodiment, a common snapshot may be initially generated and deployed as a baseline or mirroring reference for at least one type of replication (synchronous, near sync, and asynchronous) at each site A-C of the multi-site environment to minimize the amount of failover data needed to establish the synchronous/asynchronous relationships between the sites. That is, a first snapshot 51 of a category of data (e.g., UVM 210) designated for failover is generated at the primary site A and, in an embodiment, is fully replicated (e.g., via synchronous replication) to secondary site B and tertiary site C as common snapshot 51. However, in an alternate embodiment, the common snapshot 51 may be replicated from the primary site A to the secondary site B and tertiary site C using near sync replication.

The protection policy 530 may be configured to define a replication combination of near sync replication between sites A and B, and asynchronous replication between sites A and C. For near sync replication, a group of write operations (WO) for the failover data 532 issued, e.g., by UVM 210, at primary site A is organized as a file and replicated to secondary B site, which applies the write operations to common snapshot 51 to establish a "near-sync" (i.e., a low RPO below a predetermined threshold, e.g., 15 mins) recovery point (RP).

For asynchronous replication, incremental changes (deltas Δs) to the failover data (e.g., using subsequent snapshots as described herein) are sent from primary site A to tertiary site C, which applies the deltas (Δs) to S1 to establish an "async" RP. For such a replication combination, the optimizer computes a schedule that ensures retention of least "n" near-sync recovery points, where n is the RPO periodicity of the asynchronous recovery points. For example, if the schedule between primary site A and tertiary site C specifies an RPO of 6 hours, but a schedule between primary site A and secondary site B specifies 1 hour, the protection plan may set retention of at least six (6) near-sync RPs at site B. Similarly, for the computed schedule 540 between primary site A and tertiary site C, the protection policy sets retention of one (1) async RP at each site. Thus, regardless of the type of replication, the global constraint optimizer computes a schedule 540 that defines parameters such as the frequency 542 at which common snapshots are periodically generated as (i) mirroring references for synchronous (near sync) replication between sites A and B, or (ii) incremental changes/identifiers for asynchronous replication between sites A and C. The computed schedule also defines parameters such as the number of snapshots needed to be retained (i.e., retention 544) at each site so as to provide the latest common snapshot used as the recovery point. Notably, the latest common snapshot may be maintained at each site by applying deltas from other sites as needed to maintain RPO requirements for the data between the sites.

In one or more embodiments, the optimizer may also compute and configure a schedule 540 between secondary site B and tertiary site C that would be implemented in the event of failover from primary site A to secondary site B. For example, assume a failure of primary site A that results in a failover operation of the failover data 532 from primary site A to secondary site B. If the schedule 540 between secondary site B and tertiary site C is computed and activated, full synchronous replication from secondary site B (the new primary site) to tertiary site C (new secondary site) is obviated because of the presence and maintenance of the common snapshot used as the recovery point at those sites.

In an embodiment, the frequency parameter 542 for snapshot generation may be expressed in units of time, such as on an hourly basis. However, if snapshots retained at each site are generated at different points within the specified frequency parameter (e.g., within the hour), then those snapshots may have differing (i.e., un-synchronized) contents, thus obviating realization of a common snapshot (recovery point) among the sites. For example, assume the administrator defines an RPO=1 hour for failover data between sites A and B, and the global constraint optimizes computes a schedule 540 that defines a frequency of hourly snapshot generation. Snapshots are thereafter generated at the top of the hour (e.g., 9:00, 10:00, 11:00, etc.) at the primary site A and replicated to the secondary site B. Assume further that the administrator defines an RPO=1 hour for failover data 532 between sites A and C, and the optimizer may compute a schedule 540 that again defines a frequency of hourly snapshot generation. However, snapshots are thereafter generated at 30 mins past the hour (e.g., 9:30, 10:30, 11:30, etc.) at the primary site A and replicated to the tertiary site C. Accordingly, there is no common snapshot (recovery point) between sites B and C.

In accordance with the technique, a start time parameter 546 may be provided that specifies a time at which to generate the snapshots for the defined frequency parameter 542. To ensure synchronization of a common snapshot (recovery point) among each site of the multi-site data replication environment, the same start time parameter may be provided for the snapshots that are generated site A and replicated to sites B and C, e.g., at the top of the hour. Note that the frequency and retention parameters may differ for the replication relationship between sites A-B and sites A-C. For example, sites A-B may have an hourly frequency of snapshot generation and replication (e.g., 9:00, 10:00, 11:00, etc.), whereas sites A-C may have a bi-hourly frequency of snapshot generation and replication (e.g., 9:00, 11:00, etc.). The technique further ensures that the previous common snapshot (e.g., 9:00 snapshot) among the sites is retained (i.e., not deleted) until the next common snapshot (e.g., 11:00 snapshot) is replicated and retained at the sites.

To that end, the constraint optimizer calculates the snapshot retention 544 (i.e., number of snapshots to retain) at each site of the multi-site data replication environment based on directional pair-wise replication (source→destination replication links) from a perspective of a source site to a destination site. For example, the three sites A, B, C illustrated in FIG. 5 may have six different replications—each site may connect to two others in a specific replication direction (i.e., source to destination), where site A replicating to site B may be represented as A→B. Note a primary site (source) may need replication from its secondary site (destination) after a failure in order to recover. As such, the constraint optimizer may calculate the retention value at each site for the replication link based on a least common multiple (LCM) of RPOs between sites, where the RPO between sites A and B may be expressed as RPO(AB), as indicated at Table 1 below for a three site DR environment:

TABLE 1

| Replication Link (source->destination) | Where Snapshots are retained | Snapshot Retention |
| --- | --- | --- |
| link A (replicate A->B) | retention at A for replication A->B | minimum retention for link B and link D |
| link B (replicate B->A) | retention at B for replication B->A | LCM (RPO(AB), RPO(AC) )/ divided by RPO(AB) |
| link C (replicate A->C) | retention at A for replication A->C | minimum retention for link B and link D |
| link D (replicate C->A) | retention at C for replication C->A | LCM (RPO(AB), RPO(AC) ) divided by RPO(AC) |
| link E (replicate B->C) | retention at B for replication B->C | retention for link A |
| link F (replicate C->B) | retention at C for replication C->B | retention for link B |

Notably, the retentions are calculated so as to reduce transmission of the incremental snapshots between the sites to an amount just above what is sufficient to maintain the RPO requirements. In this manner the network bandwidth is used as efficiently as possible, while allowing recovery from a last snapshot from any site Note, also that the technique may be extended to larger multi-site environments having more than three nodes, where the least common multiple of all sites is considered for calculating the retention set value at, e.g., A for replication from site A. Similarly, the retention at, e.g., site A, is calculated from the minimum of retention set values at all other sites (e.g., for four sites minimum of sites B, C, D).

Illustratively, for the three site DR environment for data of various UVMs having example RPOs between the primary site A to secondary site B and to tertiary site C respectively (expressed as RPO(AB) and RPO(AC)) of 1 hour/6 hours for UVM 210a, 2 hours/3 hours for UVM 210b and 2 hours/4 hours for UVM 210c may be calculated as follows in Table 2 based on the computation indicated in Table 1:

TABLE 2

| Data for DR | Required RPO(AB) | Required RPO(AC) | Recommended RPO(BC) | Calculated retention at (A) for A -> B | Calculated retention at (B) for B -> A | Calculated retention at (A) for A -> C | Calculated retention at (C) for C -> A | Calculated retention at (B) for B -> C | Calculated retention at (C) for C -> B |
| --- | --- | --- | --- | --- | --- | --- | --- | --- | --- |
| UVM 210a | 1 | 6 | 1 | 1 | 6 | 1 | 1 | 1 | 6 |
| UVM 210b | 2 | 3 | 2 | 2 | 3 | 2 | 2 | 2 | 3 |
| UVM 210c | 2 | 4 | 2 | 1 | 2 | 1 | 1 | 1 | 1 |

Notably, the technique includes recommended RPO requirements (e.g., recommended RPO(BC) for sites not specifically constrained by the administrator, based on a minimum of the RPOs between the primary and failover sites. Illustratively, for a three site DR environment given RPO requirements for the primary site A to secondary site B and to tertiary site C (i.e., RPO(AB) and RPO(AB)), the calculation for recommended RPO(BC) is: minimum of RPO(AB) and RPO(AC). In addition, a global RPO constraint may be applied to avoid accumulation of excessive change data (i.e., deltas) to be replicated between sites. Illustratively, for the three site DR environment from the primary site A to failover sites B and C, a global RPO constraint may be: the least common multiple of RPO(AB) and RPO(AC) must be less than or equal to 24 hours.

Once the protection policy 530 is established and the schedule 540 (configuration) is created by the global constraint optimizer, the central resource manager 520 forwards (pushes) the configuration to the local resource manager 350 running on CVM 300 in each site. Thereafter, the central resource manager 520 periodically checks the configuration (e.g., categories and PRs) and pushes any changes to the configuration to the local resource manager 350, which cooperates with the replication manager 320 of the CVM 300 to implement the configuration. As noted, the central and local resource manager processes are illustratively embodied as instantiations of the management plane at which the administrator expresses a business intention for data protection in, e.g., a multi-site DR environment by providing constraints that are processed by the global constraint optimizer to create the schedule/configuration of the protection policy 530. The replication manager 320 is an instantiation of the control plane at each site that is configured to drive (control) the configuration (and changes thereto) for implementation by the data I/O manger 330, which is an instantiation of the data plane.

In an embodiment, the central resource manager 520 may be further configured as a compliance checking engine that verifies the configuration of the protection policy 530 pushed to the local resource manager 350 of each site. Illustratively, such compliance checking involves ensuring that the data failover categories and PRs provided by the administrator, as well as the snapshot frequency and retention parameters of the schedule 540 prepared by the global constraint optimizer, are sufficient to satisfy the RPO requirements at each site, i.e., the PRs applied to the RPO requirements are correct and verified. An optimized protection policy and schedule is then presented to the administrator either graphically or numerically via the "pane-of-glass" UI. Thereafter, the engine performs continuous compliance verification, particularly for changes to the configuration, and if any violation of the policy or schedule is discovered, alerts the administrator via a warning display at the UI. The alert may further notify the administrator of a vulnerability that may arise and affect the efficiency of data protection due to, e.g., non-compliance of a configuration change that is contrary to initial configuration settings. Note that compliance with the configuration settings is intended to improve (optimize) network efficiency by minimizing the amount of data transfer needed to establish and maintain synchronization of the common snapshot while satisfying RPO constraints.

Advantageously, the technique described herein provides efficient network utilization for data failover by creation and deployment of a protection policy that ensures maintenance of one or more common snapshots in a multi-site data replication environment. Unlike prior approaches that employ sophisticated messaging protocols over a network connecting the multiple sites and typically explicit locking algorithms to ensure that the common snapshot is created and thereafter maintained (i.e., not deleted) until a new common snapshot is created, the technique provides network efficient data failover using a schedule of snapshot generation and replication among the sites that results in a near network bandwidth-optimal configuration that ensures retention of a latest common snapshot used as a recovery point to satisfy RPO requirements at the sites.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks, electronic memory, and/or CDs) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
    transmitting incremental replication of snapshots of data for failover from a first node of a first site to second and third nodes of second and third sites, respectively, to maintain first and second recovery point objective (RPO) requirements respectively at each site connected by a network to the other sites;
    computing a first policy rule for retention of a first number of the snapshots at the second site to maintain the first RPO requirement, wherein the transmission of incremental replication of snapshots of the data to the second node is adjusted according to the first policy rule; and
    computing a second policy rule for retention of a second number of the snapshots at the third site to maintain the first and second RPO requirements such that recovery time from the third site after a failure of the second site is sufficient to satisfy the first RPO requirement, wherein the transmission of incremental replications of snapshots of the data to the third site from the first and second nodes is adjusted according to the second policy rule to ensure availability of a latest common snapshot used as a recovery point at each sit to satisfy the RPO requirements.

2. The method of claim 1 wherein transmitting further comprises scheduling transmission of the incremental replication of snapshots at each site to satisfy the first and second RPO requirements for the failover data, wherein the failover data is recoverable from a last snapshot at any site.

3. The method of claim 1 wherein the second policy rule is computed such that recovery time from the second site after failure of the third site satisfies the second RPO requirement.

4. The method of claim 1 further comprising computing a third policy rule for a third RPO requirement of the failover data between the second and third sites.

5. The method of claim 1 wherein the policy rules are computed to reduce transmission of the incremental replication of snapshots between the sites to an amount just above what is sufficient to maintain the RPO requirements.

6. The method of claim 5 wherein computation of the second policy rule is based on a least common multiple of the first and second RPO requirements.

7. The method of claim 5 wherein the first policy rule is based on a minimum of the first number of retained snapshots at the second site and a third number of retained snapshots at the third site.

8. The method of claim 1 further comprising applying a global RPO threshold when computing the policy rules such that a least common multiple of the first and second RPO requirements is less than or equal to the global RPO threshold.

9. The method of claim 1 wherein computing the policy rules is based on determining a type of replication selected from asynchronous replication and synchronous replication according to an RPO threshold.

10. The method of claim 1 further comprising verifying that the computed policy rules satisfy the RPO requirements and providing a warning for a violation of compliance with the verification.

11. The method of claim 1 wherein the snapshots include a light-weight snapshot based on a write operations log and wherein the incremental replication transmission includes the log.

12. The method of claim 1 wherein the failover data includes data from virtual disks.

13. A non-transitory computer readable medium including program instructions for execution on a processor, the program instructions configured to:
    transmit incremental replication of snapshots of data for failover from a first node of a first site to second and third nodes of second and third sites, respectively, to maintain first and second recovery point objective (RPO) requirements respectively at each site connected by a network to the other sites;
    compute a first policy rule for retention of a first number of the snapshots at the second site to maintain the first RPO requirement, wherein the transmission of incremental replication of snapshots of the data to the second node is adjusted according to the first policy rule; and
    compute a second policy rule for retention of a second number of the snapshots at the third site to maintain the first and second RPO requirements such that recovery time from the third site after a failure of the second site is sufficient to satisfy the first RPO requirement, wherein the transmission of incremental replication of snapshot of the data to the third site from the first and second nodes is adjusted according to the second policy rule to ensure availability of a latest common snapshot used as a recovery point at each site to satisfy the RPO requirements.

14. The non-transitory computer readable medium of claim 13, wherein the program instructions configured to transmit incremental replication of snapshots further include program instructions configured to schedule transmission of the incremental replication of snapshots at each site to satisfy the first and second RPO requirements for the failover data, wherein the failover data is recoverable from a last snapshot at any site.

15. The non-transitory computer readable medium of claim 13, wherein the second policy rule is computed such that recovery time from the second site after failure of the third site is sufficient to satisfy the second RPO requirement.

16. The non-transitory computer readable medium of claim 13, wherein the program instructions are further configured to compute a third policy rule for a third RPO requirement of the failover data between the second and third sites.

17. The non-transitory computer readable medium of claim 13, wherein the policy rules are computed to reduce transmission of the incremental replication of snapshots between the sites to an amount just above what is sufficient to maintain the RPO requirements.

18. The non-transitory computer readable medium of claim 13, wherein the program instructions are further configured to apply a global RPO threshold when computing the policy rules such that a least common multiple of the first and second RPO requirements is less than or equal to the global RPO threshold.

19. The non-transitory computer readable medium of claim 13, wherein the program instructions configured to compute the policy rules are based on determining a type of replication selected from asynchronous replication and synchronous replication according to an RPO threshold.

20. An apparatus comprising:
a network connecting a first node of a first site to remote nodes of second and third sites, the first node having a processor configured to execute program instructions to:
transmit incremental replication of snapshots of data for failover from the first site to the second and third sites, respectively, to maintain first and second recovery point objective (RPO) requirements respectively at each site;
compute a first policy rule for retention of a first number of the snapshots at the second site to maintain the first RPO requirement, wherein the transmission of incremental replication of snapshots of the data to the second node is adjusted according to the first policy rule; and
compute a second policy rule for retention of a second number of the snapshots at the third site to maintain the first and second RPO requirements such that recovery time from the third site after a failure of the second site is sufficient to satisfy the first RPO requirement, wherein the transmission of incremental replication of snapshots of data to the third site from the first and second nodes is adjusted according to the second policy rule to ensure availability of a latest common snapshot used as a recovery point at each site to satisfy the RPO requirements.

* * * * *